US012561906B2

(12) United States Patent
Tananaev et al.

(10) Patent No.: US 12,561,906 B2
(45) Date of Patent: Feb. 24, 2026

(54) METHOD FOR GENERATING AT LEAST ONE GROUND TRUTH FROM A BIRD'S EYE VIEW

(71) Applicant: Robert Bosch GmbH, Stuttgart (DE)

(72) Inventors: Denis Tananaev, Sindelfingen (DE); Ze Guo, Berlin (DE)

(73) Assignee: ROBERT BOSCH GMBH, Stuttgart (DE)

( * ) Notice: Subject to any disclaimer, the term of this patent is extended or adjusted under 35 U.S.C. 154(b) by 222 days.

(21) Appl. No.: 18/154,219

(22) Filed: Jan. 13, 2023

(65) Prior Publication Data

US 2023/0230317 A1 Jul. 20, 2023

(30) Foreign Application Priority Data

Jan. 18, 2022 (DE) ..................... 10 2022 200 503.1
Dec. 22, 2022 (DE) ..................... 10 2022 214 330.2

(51) Int. Cl.
| | |
|---|---|
| *G06T 17/05* | (2011.01) |
| *G01S 17/89* | (2020.01) |
| *G06T 5/20* | (2006.01) |
| *G06T 7/10* | (2017.01) |

(52) U.S. Cl.
CPC .............. *G06T 17/05* (2013.01); *G01S 17/89* (2013.01); *G06T 5/20* (2013.01); *G06T 7/10* (2017.01); *G06T 2207/20036* (2013.01)

(58) Field of Classification Search
None
See application file for complete search history.

(56) References Cited

U.S. PATENT DOCUMENTS

| | | | |
|---|---|---|---|
| 11,354,913 B1* | 6/2022 | Houston | G01S 17/931 |
| 2019/0266418 A1* | 8/2019 | Xu | G06V 10/764 |
| 2019/0371052 A1* | 12/2019 | Kehl | G01C 21/3602 |
| 2020/0025931 A1* | 1/2020 | Liang | G06F 18/2413 |
| 2021/0063578 A1* | 3/2021 | Wekel | G01S 17/894 |
| 2021/0146952 A1* | 5/2021 | Vora | G06N 3/0495 |
| 2021/0201569 A1* | 7/2021 | Marschner | G01S 17/89 |
| 2021/0278852 A1* | 9/2021 | Urtasun | G05D 1/0214 |
| 2021/0342608 A1 | 11/2021 | Smolyanskiy et al. | |
| 2021/0365697 A1* | 11/2021 | Vaquero Gomez | G06N 3/09 |
| 2022/0012466 A1* | 1/2022 | Taghavi | G06F 18/2163 |
| 2022/0114764 A1* | 4/2022 | Beijbom | G06T 9/001 |
| 2022/0214457 A1* | 7/2022 | Liang | G06F 18/253 |
| 2022/0317305 A1* | 10/2022 | Chou | G05D 1/0251 |

(Continued)

OTHER PUBLICATIONS

Cao, et al.: "Multi-View Frustum Pointnet for Object Detection in Autonomous Driving," 2019 IEEE International Conference on Image Processing (ICIP) IEEE, (2019), pp. 3896-3899; doi: 10.1109/ICIP.2019.8803572.

(Continued)

*Primary Examiner* — Hilina K Demeter
(74) *Attorney, Agent, or Firm* — NORTON ROSE FULBRIGHT US LLP

(57) ABSTRACT

A method for generating at least one image from a bird's eye view. The method includes: a) carrying out a sensor data point cloud compression; b) carrying out a point cloud filtering in a camera perspective; c) carrying out an object completion; and d) carrying out a bird's eye view segmentation and generating an elevation map.

17 Claims, 2 Drawing Sheets

(56)         References Cited

U.S. PATENT DOCUMENTS

2023/0105331 A1*   4/2023   Cheng ..................... G06F 18/24
                                                        345/419
2023/0136860 A1*   5/2023   Wang ................... B60W 30/09
                                                        345/419

OTHER PUBLICATIONS

Imad, et al.: "Transfer Learning Based Semantic Segmentation for 3D Object Detection from Point Cloud," Sensors, 21, (2021), pp. 1-15. doi:10.3390/s21123964.
Meyer, et al.: "Sensor Fusion for Joint 3D Object Detection and Semantic Segmentation," Proceedings of the IEEE/CVF Conference on Computer Vision and Pattern Recognition Workshops, (2019), pp. 1-8; https://openaccess.thecvfcom/content_CVPRW _2019/papers/WAD/Meyer _ Sensor_Fusion for _ Joint_ 30 _Object_ Detection _ and Semantic _ Seg mentation _ CVP RW_2019 paper.pdf.
Qi, et al.: "Offboard 3D Object Detection from Point Cloud Sequences," Proceedings of the IEEE/CVF Conference on Computer Vision and Pattern Recognition, (2021), pp. 6134-6144; https://openaccess.thecvf.com/content/CVPR2021 /papers/Qi_ Offboard 3O _ Object_ Detection_From_Point_Cloud_Sequences_ CVPR_2021 _paper. pdf.
Wen, et al . . . : "Fast and Accurate 3D Object Detection for Lidar-Camera-Based Autonomous Vehicles Using One Shared Voxel-Based Backbone," IEEE Access 9, (2021), pp. 22080-22089. doi:10.1109/ACCESS.2021.3055491.
Yang, et al.: "IPOD: Intensive Pint-based Oject Dtector for Pint Cloud," arXiv:1812.05276, 2018, pp. 1-9; doi:10.48550/arXiv.1812. 05276.
Higgins, Sean: "How dynamic object removal helps you capture active sites with ease", Blog, (2021), pp. 1-8, with English translation; https://www.navvis.com/blog/how-dynamic-object-removal-helps-you-capture-active-sites-with-ease.

* cited by examiner

FIG. 1

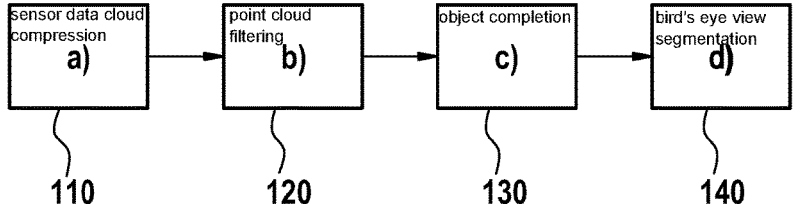

sensor data cloud compression a) 110 point cloud filtering b) 120 object completion c) 130 bird's eye view segmentation d) 140

FIG. 2

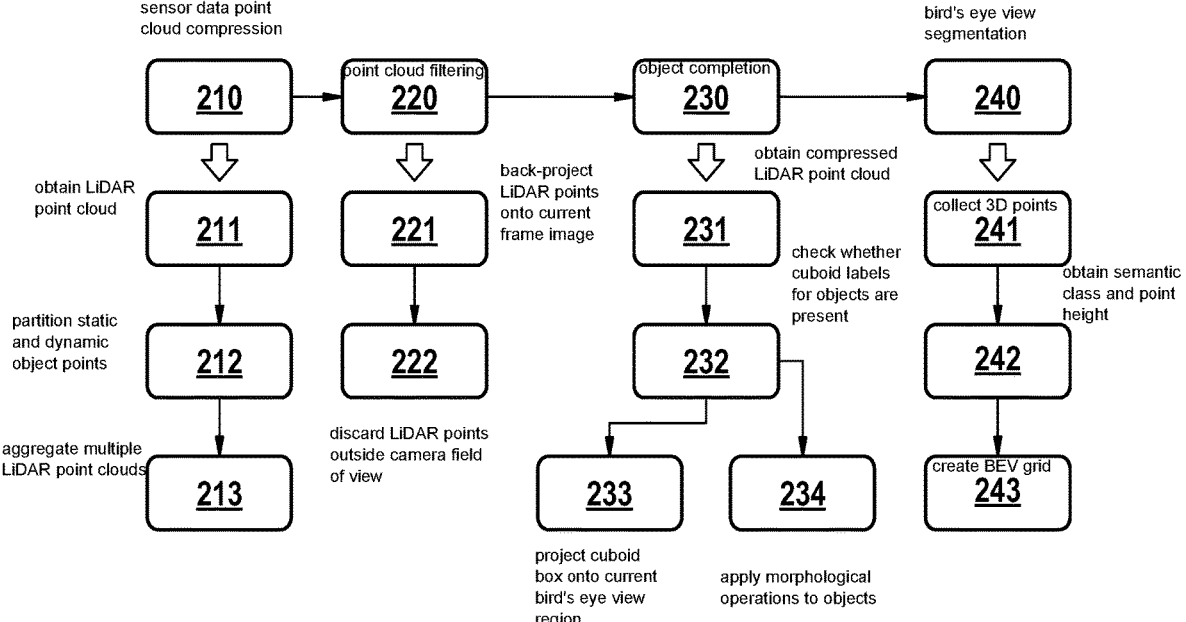

sensor data point cloud compression

210 obtain LiDAR point cloud

211 partition static and dynamic object points

212 aggregate multiple LiDAR point clouds

213 point cloud filtering

220

221

222 discard LiDAR points outside camera field of view back-project LiDAR points onto current frame image object completion

230

231 check whether cuboid labels for objects are present

232

233 project cuboid box onto current bird's eye view region

234 apply morphological operations to objects obtain compressed LiDAR point cloud bird's eye view segmentation

240 collect 3D points

241 obtain semantic class and point height

242 create BEV grid

243

FIG. 3A          FIG. 3B          FIG.3C          2
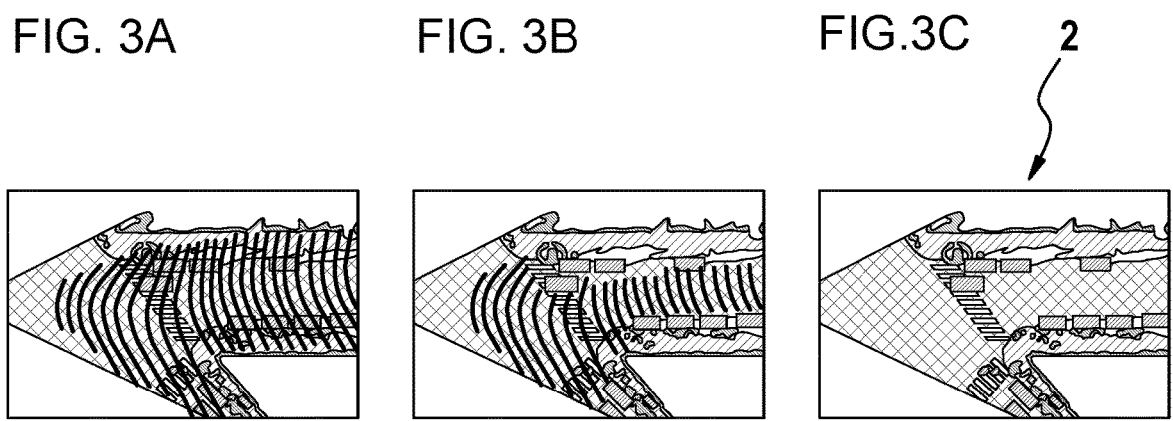
FIG. 4A          FIG. 4B          FIG. 4C
3          1          4          1
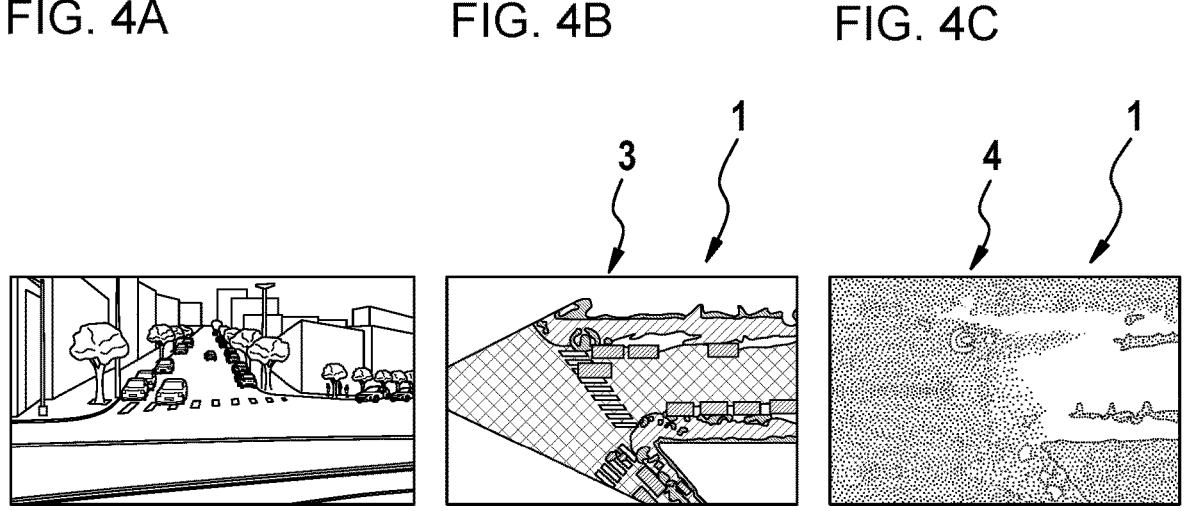

METHOD FOR GENERATING AT LEAST ONE GROUND TRUTH FROM A BIRD'S EYE VIEW

CROSS REFERENCE

The present application claims the benefit under 35 U.S.C. § 119 of German Patent Application Nos. DE 10 2022 200 503.1 filed on Jan. 18, 2022, and DE 10 2022 214 330.2 filed on Dec. 22, 2022, which are expressly incorporated herein by reference in their entireties.

FIELD

The present invention relates to a method for generating at least one ground truth from a bird's eye view, in particular based on at least one digital image depiction captured by at least one camera and on sensor data (LiDAR) captured by at least one active surroundings sensor of a system, advantageously of a vehicle.

BACKGROUND INFORMATION

Advanced driver assistance systems or autonomous driving systems typically use a perception system that advantageously provides a representation of the 3D environment and this representation can be used as an input for the motion planning system that decides how to maneuver the ego vehicle. A key technology of the perception system is recognizing where the vehicle can travel and/or what the environment around the vehicle looks like. The conventional method, which uses traditional computer vision techniques, is complex, because numerous detection algorithms are developed and a fusion step is carried out to obtain an overview of the 3D environment; this complicated procedure can also be computationally intensive.

On the other hand, state-of-the-art end-to-end methods can be used that predict semantic maps directly from multi-view camera images utilizing deep learning. These methods can greatly simplify the process while at the same time reducing the number of calculations in the system as a whole. Dense semantic BEV labels are advantageous for these methods.

Deep learning and generated BEV labels can be used to directly learn the semantic segmentation of the BEV. However, the used data sets either have weak ground truth labels (generated from semantically labeled stereo image pairs) that require manual refinement or are very difficult to obtain (e.g., HD maps) or they originate entirely from a simulation environment. These approaches are typically not suitable for providing a high quality perception system for a mobile robot operating in a real environment, because there is a discrepancy between the training data and the real data.

SUMMARY

According to the present invention, a method is provided for generating at least one (ground truth) representation from a bird's eye view, in particular based on at least one digital image representation obtained from at least one camera and based on sensor data obtained from at least one active surroundings sensor of a system, advantageously of a vehicle. According to an example embodiment of the present invention, the method includes at least the following steps:
   a) carrying out a sensor data point cloud compression,
   b) carrying out a point cloud filtering in a camera perspective, c) carrying out an object completion,
   d) carrying out a bird's eye view segmentation and generating an elevation map.

To carry out the method, the steps a), b), c) and d) can, for example, be carried out at least once and/or repeatedly in the specified order. The steps a), b), c) and d) can furthermore be carried out at least partially in parallel or simultaneously. The system can be a vehicle, for example, such as a motor vehicle. The vehicle can be an automobile, for example. The vehicle or system can be configured for at least partially automated or autonomous (driving) operation.

Generation can include machine and/or automated generation, for example. The representation can include a representation of the environment (in the system) from a bird's eye view (referred to here briefly also as BEV). The representation is preferably a ground truth representation. Alternatively or cumulatively, the representation can be a digital (environment) map, such as a highly accurate environment map or HD map (high definition map) or a representation for monitoring the road infrastructure and/or traffic infrastructure.

According to an example embodiment of the present invention, the ground truth can in particular include a large number of data sets that describe a basic knowledge for training an algorithm capable of machine learning and/or a system capable of machine learning, such as an artificial neural network. The basic knowledge can in particular relate to a sufficient number of data sets to be able to train a respective algorithm or a respective system for an image evaluation.

In this case, the term "ground truth" can alternatively or additionally relate to a ground reality, a ground truth and/or a field comparison, for example. Ground truth generation advantageously enables ground truth data, in particular ground data and/or data describing the ground (position and/or progression) in the representation (of the environment) to be taken into account when analyzing information from the representation. The ground truth data can in particular provide additional information and/or reference information about conditions and/or dimensions and/or relationships in the representation. The ground truth data can in particular assist in describing at which location a (potential) object is standing on the ground or is in contact with the ground that is recognizable in the representation. For example, the ground truth data can assist in more concretely detecting or describing a (reference) object in the representation. The ground truth data can in particular assist in classifying information from the representation more precisely and/or making it possible to check the result of the classification for correctness. The ground truth data can thus particularly advantageously contribute to training an algorithm capable of machine learning and/or a system capable of machine learning, in particular an artificial neural network.

According to an example embodiment of the present invention, in step a), a sensor data point cloud compression is carried out. Step a) can include aggregating the point cloud for a given frame. This can in particular include aggregating the point cloud for a specific keyframe $f_t$ from the frames $f_{t-n}$ to $f_{t+n}$, wherein n describes half the window size for accumulation of the frames from the past and the future.

According to an example embodiment of the present invention, step a) can also include filtering dynamic objects for non-keyframes represented by point clouds. Dynamic objects can create artifacts in the point clouds while being reprojected onto the keyframe f$_t$, so all points corresponding to the dynamic objects can be filtered by using semantic labels of the point cloud.

According to an example embodiment of the present invention, step a) can also include reprojecting the point cloud onto the keyframe of the pose of the ego vehicle. Given the odometry information of the ego vehicle world_T_ego$_t \in R^{4\times4}$ for the keyframe having the timestamp t and the odometry information for other frames world_T_ego$_{t+k} \in R^{4\times4}$, where k$\in$R, and the corresponding pose of the LiDAR sensor in relation to the ego vehicle ego$_{t+k\_}$T_lidar$\in R^{4\times4}$ it is possible to calculate via a relative transformation between the LiDAR coordinate system at time t+k and the ego vehicle coordinate system at time t:

$$\text{ego}_{t\_}T\_\text{lidar}_{t+k} = \text{inv}(\text{world}\_T\_\text{ego}_t)^* \text{world}\_T\_\text{ego}_{t+k}^* \quad \text{ego}_{t+k\_}T\_\text{lidar} \qquad (1)$$

ego$_{t\_}$T_lidar$_{t+k} \in R^{4\times4}$ is the transformation from the LiDAR pose at timestamp t+k to the ego vehicle pose at timestamp t. inv( ) designates the inverse matrix operation, * designates the point product. Then, any point cloud can be reprojected, which for frames t+k, k$\in$R:

$$\text{point\_cloud\_ego}_t = \text{ego}_{t\_}T\_\text{lidar}_{t+k}^* \text{point\_} \quad \text{cloud\_homogeneous}_{t+k} \qquad (2)$$

point_cloud_ego$_t$ is the point cloud in the keyframe in ego vehicle coordinates, point_cloud_ego$_t$ is the point cloud in homogeneous coordinates for the time t+k.

For the keyframe t, only the transformation from the LiDAR coordinate system to the ego vehicle can be applied:

$$\text{point\_cloud\_ego}_t = \text{ego}_{t\_}T\_\text{lidar}_t^* \text{point\_cloud\_homogeneous}_t \qquad (3)$$

An example of the compression of point clouds can be seen in FIG. 3.

According to an example embodiment of the present invention, in step b), a point cloud filtering is carried out in a camera perspective. Step b) can include calculating the ground coordinate system for the respective cameras. Given the transformations between the camera coordinate frame and the ego vehicle coordinate frame ego_T_camera$\in R^{4\times4}$, a ground coordinate frame can be calculated that is exactly below the camera above the ground.

Given the z coordinate shift of the z ground plane and taking into account the ego vehicle coordinate system, the pitch angle of the pitch ground plane and the roll angle of the roll ground plane, the ground plane transformation for the vehicle can be set up as follows:

$$\text{ego\_T\_plane} = \begin{pmatrix} \cos(\text{pitch}) & 0.0 & -\sin(\text{pitch}) & \sin(\text{pitch})*z \\ \sin(\text{pitch})*\sin(\text{roll}) & \cos(\text{roll}) & \cos(\text{pitch})*\sin(\text{roll}) & -\cos(\text{pitch})*\sin(\text{roll})*z \\ \sin(\text{pitch})*\cos(\text{roll}) & -\sin(\text{roll}) & \cos(\text{pitch})*\cos(\text{roll}) & -\cos(\text{pitch})*\cos(\text{roll})*z \\ 0.0 & 0.0 & 0.0 & 1.0 \end{pmatrix} \qquad (4)$$

With the given ego_T_plane$\in R^{4\times4}$ and ego_T_camera$\in R^{4\times4}$, the relative transformation from the camera coordinate system to the plane coordinate system can be calculated.

$$\text{plane\_T\_camera} = \text{inv}(\text{ego}\_T\_\text{plane})^* \text{ego}\_T\_\text{camera} \qquad (5)$$

And the matrix for transformation from plane to camera can be found:

$$\text{camera\_T\_plane} = \text{inv}(\text{plane}\_T\_\text{camera}) \qquad (6)$$

To enable a right-handed plane coordinate system to be used for any given camera, an axis correction can be made:

$$rh\_\text{plane}\_T\_\text{camera} = rh\_\text{plane}\_T\_\text{plane}^* \text{plane}\_T\_\text{camera} \qquad (7)$$

rh_plane_T_plane$\in R^{4\times4}$ is the transformation matrix for the given camera position to the right-handed plane coordinate system. For the front camera, the identity matrix is rh_plane_T_plane$_{front\_camera} = I_4$, for example; for the rear camera it is:

$$rh\_\text{plane}\_T\_\text{plane}_{rear\_camera} = \begin{pmatrix} -1 & 0 & 0 & 0 \\ 0 & -1 & 0 & 0 \\ 0 & 0 & 1 & 0 \\ 0 & 0 & 0 & 1 \end{pmatrix}$$

This correction matrix can be calculated for each camera independent of the extrinsics of the camera.

According to an example embodiment of the present invention, in step b), a projection of semantically segmented LiDAR points onto the camera frame and filtering out of all points that do not fall within the camera frustum is possible as well. This can include projection of LiDAR onto the camera frame:

$$\text{point\_cloud\_camera}_t = \text{inv}(\text{ego}\_T\_\text{camera})^* \text{point\_} \quad \text{cloud\_ego\_homogeneous}_t \qquad (8)$$

Next, this can include projecting the point cloud onto the camera image.

$$\text{point\_cloud\_pixels}_t = \text{intrinsic\_matrix}^* \text{camera\_projection\_model} \quad (\text{point\_cloud\_camera}_t) \qquad (9)$$

intrinsic_matrix$\in R^{3\times3}$ is the matrix with intrinsic parameters, camera_projection_model is the projection model of the given camera (e.g. equidistant projection for a fisheye camera), for a pinhole this function produces identity mapping of the point cloud, point_cloud_pixels$_t$ are the corresponding pixel coordinates for the point cloud in the image. Then the masking can be applied:

$$\text{mask} = \text{point}_{cloud_{pixels_t}} \geq$$
$$(0, 0) \text{ and point\_cloud\_pixels}_t < (\text{image width, image height})$$

and
point_cloud_camera_z$\geq$0.0,

Here, point_cloud_camera_z is the z coordinate for each 3D point in the camera coordinate system.

The masked point cloud can be projected onto the ground coordinate system:

$$\text{point\_cloud\_}rh\_\text{plane}_t = rh\_\text{plane}\_T\_\text{camera}^* \quad (\text{point\_cloud\_camera}_t^* \text{mask}) \qquad (10)$$

According to an example embodiment of the present invention, in step c), an object completion is carried out. From the point cloud projection to the BEV, the shape of the objects in the current frame may be incomplete because the laser beam can sometimes only reach a part of the object. The completion of the object in the ground truth can advantageously be carried out by means of a neural network in that the neural network is trained by deep learning to complete the shape of the object using only a portion of the object. The existing cuboid labels, which can be 3D bounding box labels comprising different objects, can be used for this purpose.

If there are no cuboid labels, morphological operations (e.g. dilation) can advantageously be applied, in particular separately, to each object-point cluster in order to interpolate more shape information. Different filter kernels (e.g. 10×1 vertical kernels for poles, 3×3 square kernels for automobiles) can advantageously be applied for different types of objects (e.g. poles, automobiles) to restore the shape of the object as much as possible.

An example of object completion using cuboid labels can be seen in FIG. 3.

According to an example embodiment of the present invention, in step d), a bird's eye view segmentation is carried out and an elevation map is generated. The segmentation and the elevation map can advantageously be produced with the filtered points in the specific camera view and the completed object in this view.

For a given range along the x (width) and z (range) axis (BEV), for example 40 meters×60 meters and a pixel grid resolution of 0.1 meter/pixel, for example, a pixel map of 400×600, for example, can be produced. To produce the segmentation map, the corresponding semantic class of the points can be used to fill the pixel map; to produce the elevation map, the real height value of this point can be used to fill the elevation map.

An example of the label generated for the front camera is shown in FIG. 4.

According to an advantageous configuration of the present invention, it is provided that the (ground truth) representation is also at least based on sensor data obtained from at least one active surroundings sensor. The at least one active surroundings sensor preferably includes a LiDAR sensor and/or a radar sensor. The active surroundings sensor is particularly preferably a LiDAR sensor.

According to a further advantageous configuration of the present invention, it is provided that, in step a), a sensor data point cloud is split into static and dynamic object points on the basis of semantic information. A semantically labeled sensor data point cloud can be split into static and dynamic object points on the basis of semantic information, for example. An aggregation of multiple sensor data point clouds within a time interval can furthermore be carried out only for the static objects.

According to a further advantageous configuration of the present invention, it is provided that, in step b), at least one camera parameter is used to back-project sensor data points onto the current image area. In this context, sensor data points outside the camera view can advantageously be discarded.

According to a further advantageous configuration of the present invention, it is provided that, in step c) at least one cuboid box is projected onto a current bird's eye view region.

According to a further advantageous configuration of the present invention, it is provided that in step c) at least one morphological operation is applied to at least one object of a current bird's eye view region.

According to a further advantageous configuration of the present invention, it is provided that, in step d), all 3D points for the valid bird's eye view region are collected. In this context, the semantic class and the point height can advantageously be taken from each 3D point. A bird's eye view grid with a given grid resolution for segmentation and height can furthermore advantageously be produced.

According to a further aspect of the present invention, a computer program for carrying out a method presented here is provided. This relates in other words in particular to a computer program (product) comprising instructions that, when the program is executed by a computer, prompt said computer to carry out a here-described method.

According to a further aspect of the present invention, a machine-readable storage medium on which the computer program according to the present invention is stored or saved is provided. The machine-readable storage medium is typically a computer-readable data carrier.

According to a further aspect of the present invention, an object recognition system for a vehicle is provided, wherein the system is configured to carry out one of the methods described herein. The system can, for example, comprise a computer and/or a control device (controller) capable of executing instructions in order to carry out the method. For this purpose, the computer or the control device can execute the specified computer program, for example. The computer or the control device can access the specified storage medium, for instance, in order to execute the computer program.

The details, features and advantageous configurations discussed in connection with the method can accordingly also occur in the computer program presented here and/or the storage medium and/or the system and vice versa. In this respect, reference is made to the entirety of the statements there for a more specific characterization of the features.

The solution presented here and its technical environment are explained in more detail in the following with reference to the figures. It should be noted that the present invention is not intended to be limited by the embodiment examples shown. In particular, unless explicitly stated otherwise, it is also possible to extract partial aspects of the facts explained in the figures and to combine them with other components and/or insights from other figures and/or the present description.

BRIEF DESCRIPTION OF THE DRAWINGS

FIG. 1 shows an example of a sequence of a method according to an example embodiment of the present invention.

FIG. 2 shows an example of a sequence of a design variant of the method according to the present invention.

FIG. 3A-3C shows an illustration of an example of an aspect of the method, according to the present invention.

FIG. 4A-4C shows an illustration of an example of an application of the method, according to the present invention.

DETAILED DESCRIPTION OF EXAMPLE EMBODIMENTS

FIG. 1 schematically shows an example of a sequence of a method according to the present invention. The method is used to generate at least one representation 1 from a bird's eye view. The sequence of steps a), b), c) and d) represented by blocks 110, 120, 130 and 140 is an example and can, for example, be carried out at least once in the shown sequence to carry out the method.

In block 110, according to step a), a sensor data point cloud compression 2 is carried out. In block 120, according to step b), a point cloud filtering is carried out in a camera perspective. In block 130, according to step c), an object completion is carried out. In block 140, according to step d), a bird's eye view segmentation 3 is carried out and an elevation map 4 is generated (cf. FIG. 3, 4).

FIG. 2 schematically shows an example of a sequence of a design variant of the method according to the present invention. In this context, FIG. 2 schematically shows an example of an overview of a pipeline for producing a BEV ground truth.

In block 210, according to step a), a sensor data point cloud compression 2 is carried out. In this context, in block 211, a LiDAR point cloud, which is preferably semantically labeled, can be obtained. This is an example that, and possibly how, (in addition to image data) the representation 1 can also at least be based on sensor data obtained from at least one active surroundings sensor. The at least one active surroundings sensor can be a LiDAR sensor or a RADAR sensor, for example, in this case preferably a LiDAR sensor.

In block 212, a partitioning of static and dynamic object points can be carried out using semantic information. This is an example that, and possibly how, in step a), a sensor data point cloud can be split into static and dynamic object points on the basis of semantic information. In block 213, an aggregation of multiple LiDAR point clouds within a time interval can be carried out only for the static objects.

In block 220, according to step b), a point cloud filtering is carried out in a camera perspective. In this context, in block 221, camera parameters can be used to back-project LiDAR points onto the current image frame. This is an example that, and possibly how, in step b), at least one camera parameter can be used to back-project sensor data points onto the current image area. In block 222, LiDAR points outside the camera field of view can be discarded.

In block 230, according to step c), an object completion is carried out. In this context, in block 231, a compressed LiDAR point cloud can be obtained. In block 232, a check to determine whether cuboid labels for objects are present or exist can be carried out. In block 233, if the check is positive, a cuboid box can be projected into the current BEV frame. This is an example that, and possibly how, in step c), at least one cuboid box can be projected onto a current bird's eye view region.

In block 234, if the check is negative, morphological operations can be applied to objects of the current BEV frame. This is an example that, and possibly how, in step c), at least one morphological operation is applied to at least one object of a current bird's eye view region.

In block 240, according to step d), a bird's eye view segmentation 3 is carried out and an elevation map 4 is generated (see FIG. 3, 4). In this context then, in block 241, all 3D points for the valid BEV region are collected. This is an example that, and possibly how, in step d), all 3D points for the valid bird's eye view region can be collected. In block 242, the semantic class and point height of each 3D point can be obtained or adopted. In block 243, a BEV grid with a defined grid resolution (pixel/meter) for segmentation and height can be created.

One embodiment of the present invention provides an approach that makes it possible to automatically generate a high quality representation of the ground truth from a bird's eye view if LiDAR and camera sensors, with which most current autonomous systems are equipped, are present.

One objective of the perception of an autonomous mobile robot or advanced driver assistance system can be to merge the semantic and 3D information from various sensors into a so-called bird's eye view (BEV) representation for further behavior and/or motion planning. End-to-end prediction of the BEV semantic map using convolutional neural networks can be an advantageous solution.

The method according to the present invention can in particular assist in generating training data for a neural network, in particular for a convolutional neural network (CNN). According to a preferred embodiment, an automatic generation of ground truths or ground truth data for semantic maps from a bird's eye view is provided, in particular for training deep neural networks.

The present invention can be advantageous in at least one of the following aspects:

A ground truth generation pipeline for generating semantic segmentation maps and/or (object+surface) elevation maps in BEV can be provided as an input, in particular using semantically labeled point clouds, corresponding camera images, object cuboid labels (if available), intrinsic parameters of the camera and/or sensor pose information.

A unified semantic 3D map for multiple camera views can be produced.

The present invention can assist in providing at least one or more of the following advantages:

In particular in contrast to conventional methods which use semantically labeled stereo images to produce weak/sparse ground truth and then manually refine the weak labels or use HD map labels that are typically difficult to obtain, the present invention can advantageously provide an automated way to obtain a dense (high quality) BEV ground truth, in particular from semantically segmented LiDAR cameras and synchronized cameras.

The present invention can advantageously assist in enabling the same autonomous capabilities for pure camera systems as for systems that include (expensive) active sensors (e.g. LiDAR, radar, etc.).

The present invention can advantageously make it possible to produce a (high quality) bird's eye view representation of the 3D environment (around the system, e.g. a vehicle) and/or can be used as a (part of) a perception system or provide input data for a perception system for mobile robots and/or (at least partially assisted or self-driving) automobiles. Another advantageous field of application can be the automatic creation of high definition (HD) maps and/or the monitoring of roads and traffic infrastructures and the like.

At least one or more of the following inputs can be used as an input for the described method and in particular as an input for a ground truth algorithm from a bird's eye view to carry out at least part of the described method:

Semantically labeled sensor data/LiDAR point cloud

Sensor data/LiDAR poses

Images from camera(s) synchronized with the sensor data/LiDAR frames

Corresponding camera positions

Corresponding intrinsic camera parameters

Cuboid/3D bounding box labels for objects (optional)

At least one or more of the following outputs can be used as an output of the described method and in particular as an output of a ground truth algorithm (deep learning) from a bird's eye view to carry out at least part of the described method:

Semantic segmentation map in BEV

Elevation map in BEV

An example of an algorithm for carrying out an advantageous embodiment of the described method is discussed above with reference to FIGS. 1 and 2.

FIG. 3 shows an example for the compression of the BEV ground truth. FIG. 3A on the left: sparse LiDAR image or current image; FIG. 3B in the middle: application of the cuboid above; FIG. 3C on the right: aggregation over time (t=40) for static surfaces/objects.

FIG. 4 shows an example of the result of the BEV ground truth. FIG. 4A on the left: original RGB; FIG. 4B in the middle: semantic segmentation BEV map; FIG. 4C on the right: elevation map. All in front camera view.

What is claimed is:

1. A method for generating at least one representation from a bird's eye view, the method comprising the following steps:

a) carrying out a sensor data point cloud compression;

b) carrying out a point cloud filtering in a perspective of a camera;

c) carrying out an object completion; and d) carrying out a bird's eye view segmentation and generating an elevation map;

wherein the method includes at least one of the following features (I)-(III):

(I) the cloud compression includes at least one of:

(i) compressing data points from respective frames of a plurality of respective points in time into a single frame of data points; and (ii) removing respective data points based on the respective data points corresponding to dynamic objects;

(II) the point cloud filtering includes at least one of:

(i) removing data points that correspond to a location that is outside a viewing frustum of the camera; and (ii) applying the data points to a matrix having extrinsic parameters of pose of the camera in space and intrinsic parameters of the camera; and (III) the object completion includes at least one of:

(i) a neural network completing partially visible objects to which at least a part of the point cloud corresponds; and (ii) carrying out a morphological operation that fills in a missing portion of an incomplete object to which the at least the part of the point cloud corresponds.

2. The method according to claim 1, wherein the representation is also at least based on sensor data obtained from at least one active surroundings sensor, wherein the at least one active surroundings sensor includes a LiDAR sensor and/or a radar sensor.

3. The method according to claim 1, wherein, in step b), at least one camera parameter is used to back-project sensor data points onto a current image area.

4. The method according to claim 1, wherein, in step c), at least one cuboid box is projected onto a current bird's eye view region.

5. The method according to claim 1, wherein in step d), all 3D points for a valid bird's eye view region are collected.

6. The method according to claim 1, wherein the cloud compression includes the compressing of the data points from the respective frames of the plurality of respective points in time into the single frame of data points.

7. The method according to claim 1, wherein the cloud compression includes the removing of the respective data points based on the respective data points corresponding to the dynamic objects.

8. The method according to claim 7, wherein, in step a), the removing is performed based on a splitting of a sensor data point cloud is split into static and dynamic object points on the basis of semantic information.

9. The method according to claim 1, wherein the point cloud filtering includes the removing of the data points that correspond to the location that is outside the viewing frustum of the camera.

10. The method according to claim 1, wherein the point cloud filtering includes the applying of the data points to the matrix having the extrinsic parameters of pose of the camera in space and the intrinsic parameters of the camera.

11. The method according to claim 1, wherein the object completion includes the neural network completing the partially visible objects to which the at least the part of the point cloud corresponds.

12. The method according to claim 1, wherein the object completion includes the carrying out of the morphological operation that fills in the missing portion of the incomplete object to which the at least the part of the point cloud corresponds.

13. The method according to claim 12, wherein, in step c), the morphological operation is applied to at least one object of a current bird's eye view region.

14. The method according to claim 12, wherein the morphological operation is a dilation.

15. The method according to claim 1, wherein:

the cloud compression includes the compressing of the data points from the respective frames of the plurality of respective points in time into the single frame of data points;

the respective points in time include a keyframe point in time and non-keyframe points in time that are at least one of before and after the keyframe point in time; and the cloud compression further includes performing for each of the non-keyframe points in time, the removing of the respective data points based on the respective data points corresponding to the dynamic objects, while keeping respective data points corresponding to dynamic objects in the keyframe.

16. A non-transitory machine-readable storage medium on which is stored a computer program for generating at least one representation from a bird's eye view, the computer program, when executed by a computer, causing the computer to perform a method having the following steps:

a) carrying out a sensor data point cloud compression;

b) carrying out a point cloud filtering in a perspective of a camera;

c) carrying out an object completion; and d) carrying out a bird's eye view segmentation and generating an elevation map;

wherein the method includes at least one of the following features (I)-(III);

(I) the cloud compression includes at least one of:

(i) compressing data points from respective frames of a plurality of respective points in time into a single frame of data points; and (ii) removing respective data points based on the respective data points corresponding to dynamic objects;

(II) the point cloud filtering includes at least one of:

(i) removing data points that correspond to a location that is outside a viewing frustum of the camera; and (ii) applying the data points to a matrix having extrinsic parameters of pose of the camera in space and intrinsic parameters of the camera; and (III) the object completion includes at least one of:

(i) a neural network completing partially visible objects to which at least a part of the point cloud corresponds; and (ii) carrying out a morphological operation that fills in a missing portion of an incomplete object to which the at least the part of the point cloud corresponds.

17. An object recognition system for a vehicle, the system configured to generate at least one representation from a bird's eye view, the system configured to
   a) carry out a sensor data point cloud compression;
   b) carry out a point cloud filtering in a perspective of a camera;
   c) carry out an object completion; and
   d) carry out a bird's eye view segmentation and generate an elevation map;
   wherein the object recognition system includes at least one of the following features (I)-(III):
   (I) the cloud compression includes at least one of:
      (i) compressing data points from respective frames of a plurality of respective points in time into a single frame of data points; and (ii) removing respective data points based on the respective data points corresponding to dynamic objects;
   (II) the point cloud filtering includes at least one of:
      (i) removing data points that correspond to a location that is outside a viewing frustum of the camera; and
      (ii) applying the data points to a matrix having extrinsic parameters of pose of the camera in space and intrinsic parameters of the camera; and
   (III) the object completion includes at least one of:
      (i) a neural network completing partially visible objects to which at least a part of the point cloud corresponds; and
      (ii) carrying out a morphological operation that fills in a missing portion of an incomplete object to which the at least the part of the point cloud corresponds.

* * * * *